United States Patent
Mulligan et al.

(10) Patent No.: US 6,361,220 B1
(45) Date of Patent: Mar. 26, 2002

(54) TERMINAL END OF A CONNECTOR ON AN OPTICAL FIBER

(76) Inventors: Paul M. Mulligan, 9626 Lisbon Rd., Yorkville, IL (US) 60560; Carl W. Lindenmeyer, 384 D. Brittany Ct., Geneva, IL (US) 60134

( * ) Notice: Subject to any disclaimer, the term of this patent is extended or adjusted under 35 U.S.C. 154(b) by 0 days.

(21) Appl. No.: 09/676,749

(22) Filed: Oct. 2, 2000

(51) Int. Cl.⁷ .............................. G02B 6/36
(52) U.S. Cl. ........................ 385/85; 385/147
(58) Field of Search ................ 385/85, 78, 84, 385/134, 147

(56) References Cited

U.S. PATENT DOCUMENTS 3,789,485 A * 2/1974 Gudmestad
4,084,308 A * 4/1978 Runge
4,176,909 A * 12/1979 Prunier
5,553,181 A * 9/1996 van Woesik .................. 385/85

FOREIGN PATENT DOCUMENTS

JP          1-219708 A   *  9/1989

* cited by examiner

Primary Examiner—Rodney Bovernick
Assistant Examiner—Michael J Stahl
(74) Attorney, Agent, or Firm—F. L. Hart

(57) ABSTRACT

An apparatus and method for finishing the terminal end of a connector assembly which has a ferrule fixedly connected to a plastic optic fiber. The apparatus precisely maintains the connector assembly against transverse movement during cutting operations and a diamond cutting element precisely finishes the terminal end of the connector assembly relative to the connector assembly axis.

11 Claims, 3 Drawing Sheets

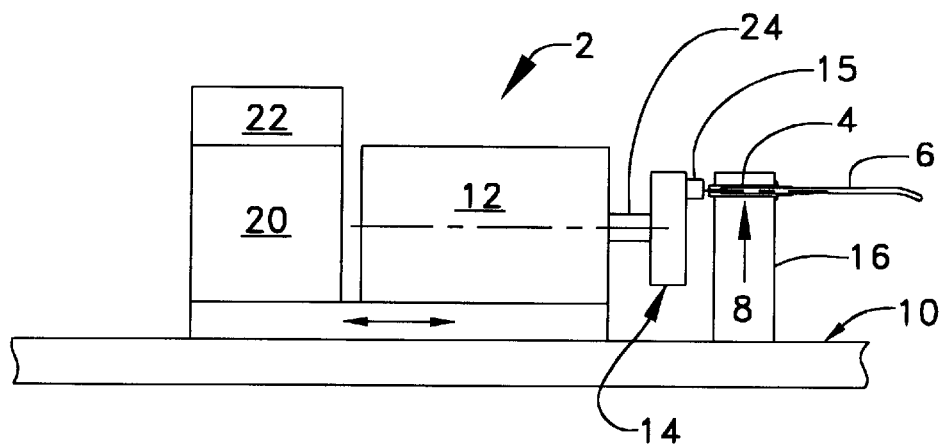
Fig_1_
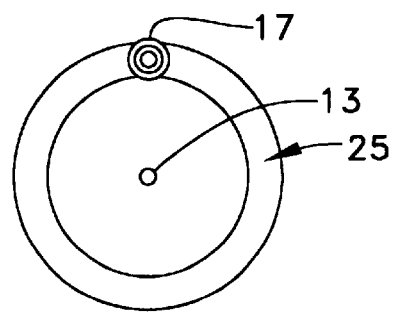
Fig_2_
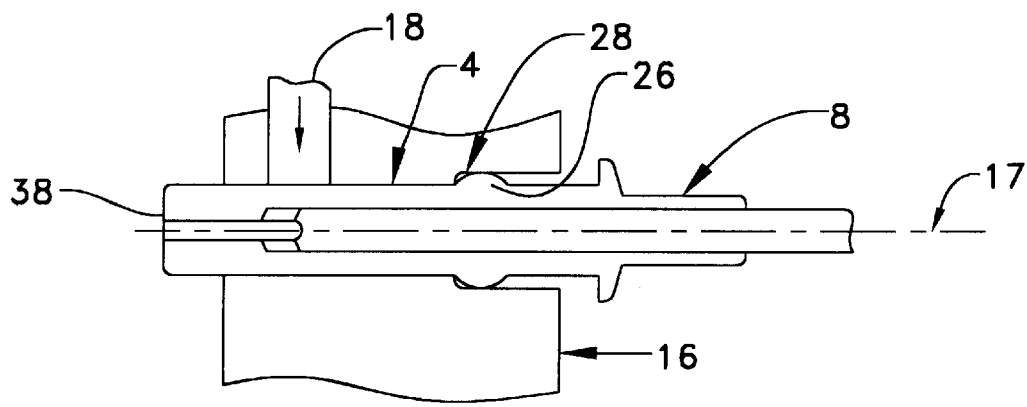
Fig_3_

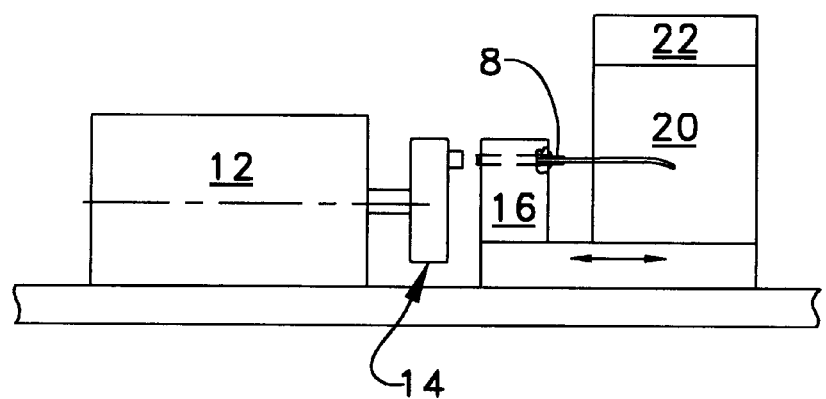
Fig_4_
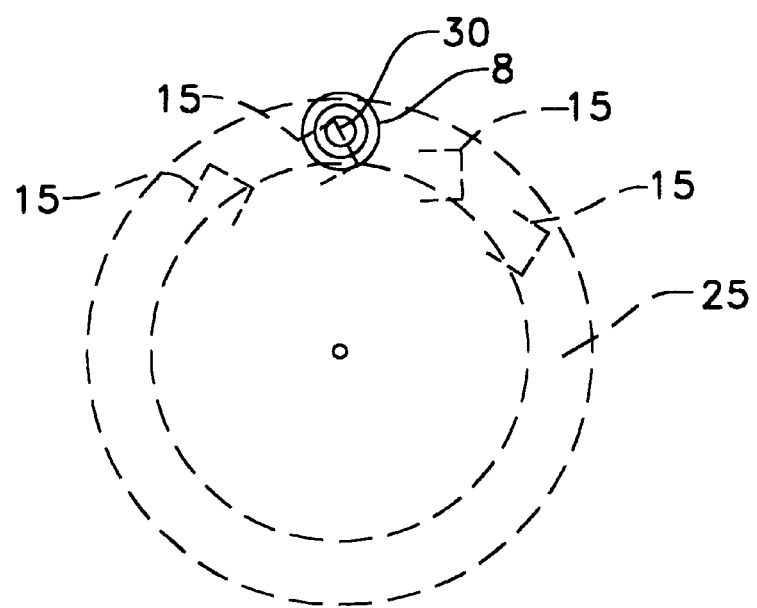
Fig_5_

Fig_6_
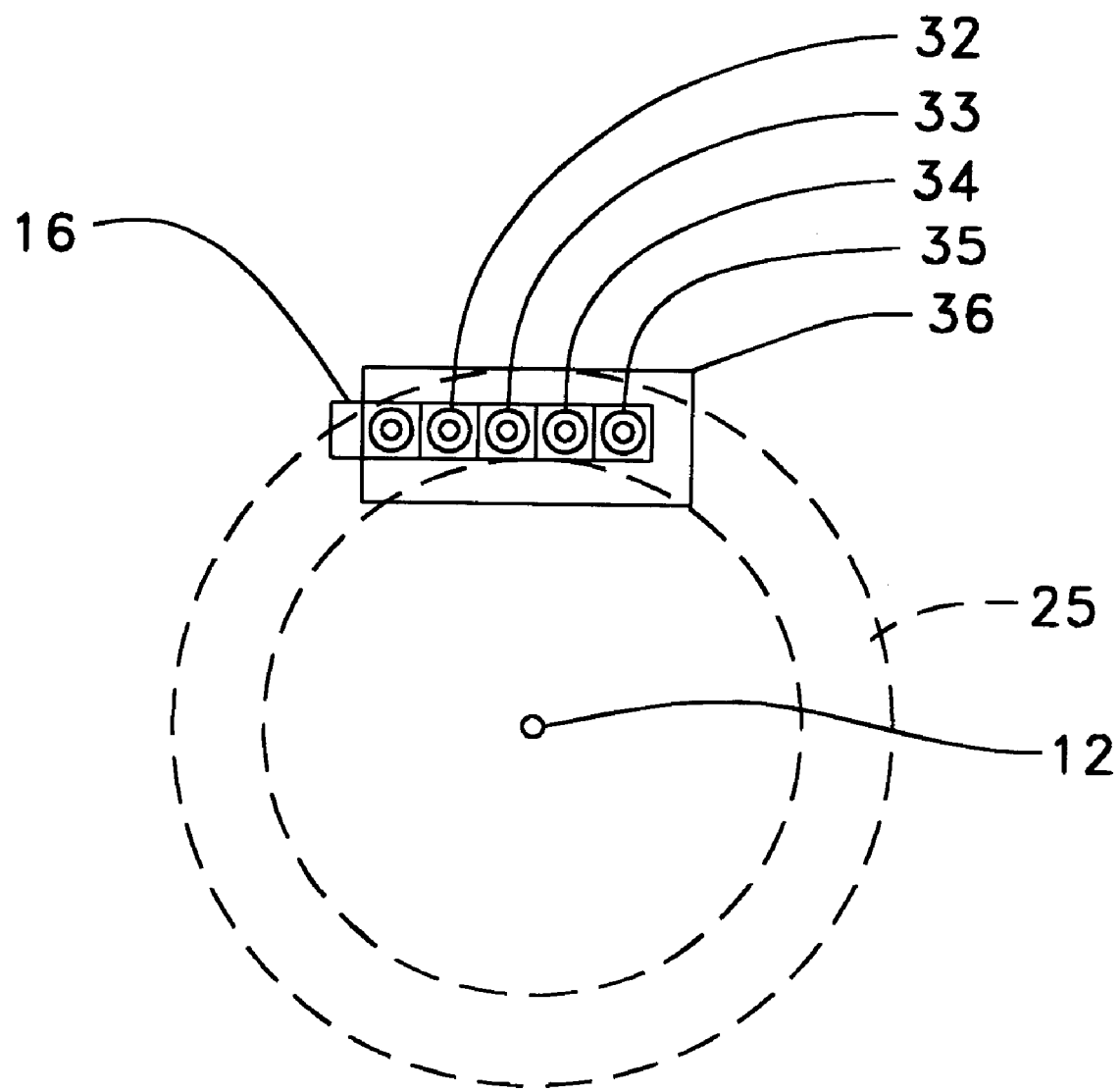

TERMINAL END OF A CONNECTOR ON AN OPTICAL FIBER

TECHNICAL FIELD

The subject invention relates to an apparatus for finishing the terminal end of a plastic optical fiber and ferrule of a connector assembly.

BACKGROUND ART

There are numerous patents on various optical fiber connector structures and method of making them. One quite common way is to form the connector structure independent of the fiber, inserting a connector and ferrule attached onto the fiber, and gluing the fiber in place. A basic problem with such an approach is that the location of the end of the coating on the fiber and the beginning of the ferrule when inserted into the connector, neither of which are visible, cannot be precisely determined. In many instances, an unsupported length of fiber exists between the end of the coating and the beginning of the ferrule. Such a structure is quite susceptible to failure as a result of the unsupported length of the optical fiber. Also, crimping is often used to hold the structure together.

A further problem with the prior art devices is failure of the cable where it joins the connector body. The use of flexible strain relief is common but the prior art strain relief devices do not bond directly to the cable jacket. An adhesive compound is often used to affix the strain relief boot the cable jacket and connector body.

There is also a problem of diversity of connectors and the problems inherent with adapting a cable-ferrule combination that can be readily adapted to a multiplicity of different connectors.

As is known, finishing the terminal end of a connector assembly has heretofore been difficult because transverse cuts of the assembly material were difficult to accurately make and anomalies thousandths of an inch can be detrimental to performance.

Finishing of plastic optical fiber mounted in a connector has also been by hot plate or abrasive polishing. These methods have difficulty maintaining a flat surface. The quality of finish is dependent on operator skill and therefore is difficult to control.

The present invention is directed to overcome one or more of the heretofore problems, as set forth above.

DISCLOSURE OF THE INVENTION

In one aspect of the invention, an apparatus is provided for finishing the terminal end of a connector assembly having a ferrule fixedly connected to a plastic optical fiber. The apparatus has a frame, a motor, a holding member a drive member and a cutting element. The motor has an axis of rotation and is connected to the frame. The holding member has an axis substantially parallel to the motor axis and laterally spaced therefrom. The holding member is connected to the frame and adapted to releasably maintain the connector assembly coaxially positioned relative to said holding member. The drive member is connected to one of the motor and the holding member for movement of one toward the other along a pathway substantially parallel to the axis of the other. The cutting assembly has a diamond cutting element. The cutting assembly is axially connected to the motor. The diamond cutting element has a linear cutting edge of a length greater than the diameter of the terminal ends of the ferrule and optical fiber.

In another aspect of the invention, a method is provided for finishing the terminal end of a connector assembly having a metal ferrule fixedly connected to a plastic optical fiber. The connector assembly is maintained at a preselected axial position and orientation. A diamond having a cutting edge is passed through the ferrule and optical fiber. Preselected portions of the terminal end portion of the connector assembly are progressively sliced therefrom at an angle of 90 degrees relative to an axis of said ferrule and optical fiber. The slicing of the connector assembly is terminated at a preselected position.

BRIEF DESCRIPTION OF THE DRAWINGS

FIG. 1 is a diagrammatic side view of the apparatus of this invention;

FIG. 2 is a diagrammatic end view of the connector element, the orientation of the motor and holding element axis, and the pathway traveled by the cutting element;

FIG. 3 is a diagrammatic partial side view in partial section showing the swaging of the ferrule to the optical fiber;

FIG. 4 is a diagrammatic side view of another embodiment of the drive member and controller;

FIG. 5 is a diagrammatic end view showing the terminal end of the connector assembly, the pathway of the cutter relative thereto and the orientation of the planar edge of the cutter relative to the pathway of travel; and FIG. 6 is a diagrammatic end view of an indexing assembly having multiple connector assemblies associated therewith.

BEST MODE FOR CARRYING OUT THE INVENTION

Referring to FIG. 1, a machine 2 is provided for finishing the terminal end of a metal or other material ferrule 4 connected to a plastic optic fiber 6 contained within the ferrule 4 forming a connector assembly 8 (see FIG. 3), hereinafter more fully described. The machine 2 thereafter progressively slices and removes portions of an end portion of the connector assembly 8 in a precise manner and to a preselected location on the connector assembly 8.

The apparatus, or machine 2 has a longitudinally extending frame 10, a motor 12, a cutting assembly 14, a holding member 16, a drive member 20 and a controller 22. The motor 12 is connected to the frame 10 and has a spindle 24. The spindle 24 is rotatable by the motor 12 about an axis of the spindle 24. A cutting assembly 14 is connected to the spindle 24 and rotated therewith along a preselected pathway. In the preferred embodiment of this invention, the cutting assembly 14 is a diamond 15.

Connected to and spaced on the frame from the motor is the holding member 16. In the preferred embodiment shown in FIG. 1, the drive member 20 is connected to the motor 12 and controllably, slidably moves the motor 12 and associated cutting element 14 toward and from the adjacent holding element 16.

FIG. 4 shows another embodiment of the apparatus 2, wherein the holding element 16 and associated coaxially oriented connector assembly 8 is connected to the drive member 20 for controllably, slidably moving the connector assembly 8 toward and from the adjacent cutting assembly 14.

It is important to note the axis 17 of the holding element 16 and associated connector assembly 8 and the axis 13 of the motor 12 and spindle 24 are parallel to each other and off set one from the other a preselected distance. This arrangement can best be seen in FIG. 2 which shows the parallel arrangement of the axis and the pathway of travel 25 of the cutting assembly 14 relative to the connector assembly 8.

In the preferred embodiment of the connector assembly 8, a terminal end portion of the ferrule 4 is deformed into forcible contact with and about substantially the entire periphery of the plastic optic fiber 6 by swaging element 18. It should be understood that swaging elements of other construction than shown can be used without departing from this invention.

Referring to FIG. 3, it has been discovered that the end portion of the ferrule 4 should be urged into forcible contact with the plastic optic fiber over a length as measured along the ferrule axis in the range of about 1 to about 3 times the diameter of the plastic optic fiber 6. Forcible contact of the ferrule 4 with the optic fiber 6 less than the above range is undesirable because the angular orientation of the fiber is not well defined and excessive compressive force must be applied to the fiber to adequately clamp it.

Forcible contact of the ferrule 4 with the optic fiber 6 greater than the above range is undesirable because it represents a waste of energy and material since greater holding power of the ferrule 4 is not necessary.

Preferably, the ferrule 4 is deformed into forcible contact with the optic fiber 6 over a length of about 2 times the diameter of the plastic optic fiber 6.

The controller 22 that moves one of the motor 12 and holding element 16 and their respective associated members, can be of various construction as is known in the art. It is preferred that the controller 22 be an electronic programmable device.

It is also preferred that the controller 22 be adapted for movement of the associated motor 12 and cutting assembly 14 at varying speeds during cutting of the connector assembly 8 by the cutting assembly 14.

It has been found that the connector assembly 8 can be constructed with a more desirable terminal end configuration if the controller 22 is adapted to move the motor 12 and associated cutting assembly 14 toward the holding element 16 at greater speeds during initial cutting action than the speeds thereafter. In this manner, as the connector assembly 8 is being reduced to desired final length by the cutting assembly 14, thinner and thinner slices are removed from the connector assembly 8, thereby providing greater control over the desired finished length of the terminal end portion of the connector assembly 8 and assuring a terminal end oriented 90 degrees relative to the optical fiber axis.

Referring to FIG. 3, the controlled finished length of the connector assembly 8 is not only controlled by the movement of the cutting element toward the connector assembly 8, but by a positive flange or stop 26 being formed on the metal ferrule 4 which cooperates with a nesting stop 28 formed on the holding element 16.

FIG. 5 is a diagrammatic view of the movement of the cutting assembly 14 relative to the terminal end portion of the connector assembly 8. In the preferred embodiment wherein the cutting assembly 14 is a diamond 15, the diamond 15 has a planar, linear edge 30 that is angularly oriented relative to the arc of travel of said diamond 15. By this orientation and controlled direction of travel, it has been discovered that less forces are subjected onto the connector assembly 8 owing to the slicing action of the diamond. This lessening of forces subjected upon the connector assembly 8 combined with the slicing action of the cutter and speed of movement of the diamond 15 toward the connector assembly 8 assures the finished terminal end 38 of the connector assembly 8 of being free from chips and oriented 90 degrees relative to the axis 17 of the connector assembly 8.

As is known in the art, a uniform butting relationship of adjacent plastic optic fibers is most important for obtaining an efficient and effective connection. It is also know that the absence of a uniform butting relationship of adjacent plastic optic fibers has been one of the major problems with heretofore connector assemblies.

The ferrule 4 used in this invention is metal and preferably the metal is aluminum, more preferably, #2011-T3 aluminum. Other materials can be used.

Referring to FIG. 6, a plurality of holding elements 16,32–35 are connected to an indexing member 36 and each are moveable by the indexing member to a preselected position relative to the axis of the motor 12 for finishing. This assembly is useful for speeding the finishing of connector assemblies and is also useful for the construction of connectors which branch from a single optic fiber or cable into multiple connections.

It should be understood that the subject invention is adapted for use on a single optical fiber, a plurality of optical fibers and a optical fiber cable and that the singular of the word "fiber" is used herein only for convenience.

INDUSTRIAL APPLICABILITY

In the connection of a metal ferrule 4 to a plastic optic fiber 6 contained therein and forming a finished connector assembly 8, the connector assembly 8 is maintained at a preselected axial position and orientation. The terminal end portion of the ferrule 4 is deformed into forcible contact with and about substantially the entire periphery of said plastic optical fiber 6. This deformation into forcible contact extends over an axially measured length of said ferrule in a range of about 1 to about 3 times the diameter of said plastic optic fiber 6.

Preselected portions of the terminal end portion of the connector assembly 8 are progressively sliced from the connector assembly 8 by a diamond 15 at an angle of 90 degrees relative to an axis of the ferrule 4. Slicing of the connector assembly 8 is terminated at a preselected position on the connector terminal end portion.

As set forth above, the preferred deformation portion of the ferrule is two times the diameter of the plastic optic fiber 6, the thickness of removed slices varies during slicing operation and the connector assembly 8 is cut by a diamond 15 in a slicing type action.

Other aspects, objects, and advantages of this invention can be obtained from a study of the drawings, the disclosure, and the appended claims.

What is claimed is:

1. An apparatus for finishing the terminal end of a connector assembly having a ferrule fixedly connected to a plastic optical fiber, comprising:

a frame;

a motor having an axis of rotation and being connected to the frame;

a holding member having an axis substantially parallel to the motor axis and laterally spaced therefrom, said holding member being connected to the frame and adapted to releasably maintain the connector assembly coaxially with said holding member;

a drive member connected to one of the motor and the holding member for movement of one toward the other along a pathway substantially parallel to the axis of said other; and a cutting assembly having a diamond cutting element, said cutting assembly being axially connected to the motor, said diamond cutting element having a linear cutting edge of a length greater than the diameter of the terminal end of the ferrule and optical fiber.

2. An apparatus, as set forth in claim 1, wherein the planar cutting edge of the diamond is spaced from the axis of the motor and angularly oriented relative to the arc of travel of said diamond.

3. An apparatus, as set forth in claim 1, wherein the drive member is connected to the motor and is adapted to move said motor and associated cutting assembly along the frame in directions toward and from said holding member.

4. An apparatus, as set forth in claim 3, including a controller connected to the drive member and adapted to move the motor and cutting assembly at varying speeds.

5. An apparatus, as set forth in claim 4, wherein the speed of movement by the drive member is substantially slower immediately adjacent the end of travel as the motor and cutting assembly approaches the holding member.

6. An apparatus, as set forth in claim 1, wherein the drive member is connected to the holding member and is adapted to move said holding member along the frame in directions toward and from said motor and cutting assembly.

7. An apparatus, as set forth in claim 6, including a controller connected to the drive member and adapted to move the holding member and associated connector assembly at varying speeds.

8. An apparatus, as set forth in claim 7, wherein the speed of movement by the drive member is substantially slower immediately adjacent the end of travel as the holding member and associated connector assembly approaches the motor.

9. An apparatus, as set forth in claim 1, wherein the speed of movement by the drive immediately adjacent the end of travel of one of the motor and the holding member toward the other is adapted to forming a connector assembly terminal end that is oriented 90 degrees relative to an axis of the connector assembly.

10. An apparatus, as set forth in claim 1, wherein said holding member includes a stop contactable by a flange on said ferrule and adapted to position the connector assembly at a preselected position relative to said holding member.

11. A method for finishing the terminal end of a connector assembly having a ferrule fixedly connected to a plastic optical fiber, comprising:

maintaining the connector assembly at a preselected axial position and orientation;

passing a diamond having a cutting edge through the ferrule and optical fiber;

progressively slicing preselected portions from a terminal end portion of said connector assembly at an angle of 90 degrees relative to an axis of said ferrule;

terminating slicing of said connector assembly at a preselected position on said terminal end portion; and deforming the ferrule into forcible contact with the plastic optic fiber over an axially measured length of about 2 times the diameter of said plastic optic fiber.

* * * * *